(12) United States Patent
Tong et al.

(10) Patent No.: US 10,187,649 B2
(45) Date of Patent: Jan. 22, 2019

(54) SYSTEMS AND METHODS FOR HYBRID VIDEO ENCODING

(71) Applicant: Hangzhou Hikvision Digital Technology Co., Ltd., Hangzhou (CN)

(72) Inventors: Junyan Tong, Hangzhou (CN); Shiliang Pu, Hangzhou (CN); Linjie Shen, Hnagzhou (CN); Cheng Ma, Hangzhou (CN); Zhigang Hu, Hangzhou (CN); Ye Ren, Hangzhou (CN); Hai Yu, Hangzhou (CN)

(73) Assignee: Hangzhou Hiksvision Digital Technology Co., Ltd., Hangzhou (CN)

( * ) Notice: Subject to any disclaimer, the term of this patent is extended or adjusted under 35 U.S.C. 154(b) by 262 days.

(21) Appl. No.: 15/064,744

(22) Filed: Mar. 9, 2016

(65) Prior Publication Data

US 2016/0269734 A1 Sep. 15, 2016

(30) Foreign Application Priority Data

Mar. 10, 2015 (CN) .......................... 2015 1 0103507

(51) Int. Cl.
*H04N 19/23* (2014.01)
*H04N 19/115* (2014.01)
(Continued)

(52) U.S. Cl.
CPC .......... *H04N 19/23* (2014.11); *H04N 19/103* (2014.11); *H04N 19/115* (2014.11);
(Continued)

(58) Field of Classification Search
CPC .. H04N 19/103; H04N 19/142; H04N 19/146; H04N 19/176; H04N 19/23; H04N 19/115; H04N 19/137; H04N 19/167
See application file for complete search history.

(56) References Cited

U.S. PATENT DOCUMENTS 5,787,199 A * 7/1998 Lee ..................... H04N 19/503
348/415.1
7,016,411 B2 3/2006 Azuma et al.
(Continued)

FOREIGN PATENT DOCUMENTS

| CN | 103179402 A | 6/2013 |
| WO | WO 2007/093199 | 8/2007 |
| WO | WO 2010/043140 | 4/2010 |

OTHER PUBLICATIONS

Wong, Da-Yong, Sun, Shi-Xin; Region-Based Rate Control and Bit Allocation for Video Coding; International Conference on Apperceiving Computing and Intelligence Analysis; pp. 147-151; Dec. 2008.

(Continued)

*Primary Examiner* — Zhihan Zhou
(74) *Attorney, Agent, or Firm* — Jones Day

(57) ABSTRACT

Systems and methods are provided for hybrid video encoding. An example method includes: acquiring image information; extracting a background image based at least in part on the image information; detecting whether the background image is stable; and performing encoding switching between a background-based encoding method and a non-background encoding method based at least in part on the detection.

14 Claims, 18 Drawing Sheets

(51) Int. Cl.
*H04N 19/137* (2014.01)
*H04N 19/167* (2014.01)
*H04N 19/103* (2014.01)
*H04N 19/142* (2014.01)
*H04N 19/146* (2014.01)
*H04N 19/176* (2014.01)

(52) U.S. Cl.
CPC ......... *H04N 19/137* (2014.11); *H04N 19/142* (2014.11); *H04N 19/146* (2014.11); *H04N 19/167* (2014.11); *H04N 19/176* (2014.11)

(56) References Cited

U.S. PATENT DOCUMENTS

| | | | | |
|---|---|---|---|---|
| 7,321,624 | B1* | 1/2008 | Allmen | H04N 19/172 375/240.08 |
| 9,232,233 | B2 | 1/2016 | Zhou et al. | |
| 2003/0095598 | A1* | 5/2003 | Lee | H04N 19/176 375/240.08 |
| 2010/0119157 | A1* | 5/2010 | Kameyama | H04N 19/115 382/195 |
| 2012/0169923 | A1* | 7/2012 | Millar | H04N 19/23 348/399.1 |
| 2013/0129144 | A1* | 5/2013 | Chang | G06K 9/62 382/103 |
| 2013/0142250 | A1* | 6/2013 | Berbecel | H04N 19/197 375/240.03 |

OTHER PUBLICATIONS

Schaefer, R.; MPEG-4: A Multimedia Compression Standard for Interactive Applications and Services; Electronics & Communication Engineering Journal, 10(6); pp. 253-262; Dec. 1998.

Liu, Chang, Cao, Ruipeng, Jia, Sa, Zhang, Yanan, Wang, Bo, Zhao, Qingjie; The PTZ Tracking Algorithms Evaluation Virtual Platform System; 2014 International Conference on Multisensor Fusion and Information Integration or Intelligent Systems; pp. 1-6; Sep. 2014.

European Patent Office; European Search Report, EP 16159613; dated May 2, 2016.

U.S. Appl. No. 14/994,270, filed Jan. 13, 2016, Chen et al.
U.S. Appl. No. 14/995,256, filed Jan. 14, 2016, Chen et al.
U.S. Appl. No. 14/995,243, filed Jan. 14, 2016, Shen et al.

\* cited by examiner

SYSTEMS AND METHODS FOR HYBRID VIDEO ENCODING

CROSS-REFERENCES TO RELATED APPLICATIONS

The application claims priority to Chinese Patent Application No. 201510103507.4, filed Mar. 10, 2015, incorporated by reference herein for all purposes.

BACKGROUND

With the increasing demand of modern society for emergency investigation, public safety monitoring and intelligent data analysis, video monitoring systems are widely applied in society. In recent years, "smart city" projects to promote safe city have started in many big cities in China, e.g., traffic monitoring, campus monitoring, building monitoring, court monitoring, bank monitoring and venue monitoring. Video monitoring can be seen almost everywhere in modern life for people's safety, traffic safety, sanitary safety, societal safety and production safety.

A large amount of monitoring video data usually needs huge storage cost. To reduce storage cost, the conventional technology often sacrifices video quality, which goes against the fundamental objective of video monitoring—capability of identification. Therefore, facing such a large volume of monitoring video data, a video encoding technique with higher compression ratio is needed to save storage cost.

Monitoring video data has its own characteristic. Background scenario information is relatively stable. The foreground and the background of an image can be segmented utilizing a background segregation technology for intelligent analysis and relevant information is sent to an encoder. Then, the encoder can further improve the compression ratio of the background information without influencing quality, thereby reducing the storage cost of video.

The foreground mainly includes targets of interest, moving objects and objects that approach camera. The background mainly refers to targets of no interest, still objects and objects that move away from the camera.

Video cameras for video monitoring include two types, namely, stationary cameras and dynamic cameras. After a stationary camera is installed, the background can be stably obtained. If results of the background-foreground segregation are used for encoding, the bit rate can be reduced without sacrificing encoding quality of target of interest. If a dynamic camera rotates, the background changes accordingly. Maintaining the background may be difficult, and clean background may not be obtained. During the rotation process, foreground and background are used for encoding; therefore the bit rate can increase. Moreover, the reference background can expire, and the encoding quality may suffer, so that semi-structured encoding may not be achieved.

Hence it is highly desirable to improve the techniques for video encoding.

BRIEF SUMMARY

Provided herein are methods for hybrid video encoding. An example method includes: acquiring image information; extracting a background image based at least in part on the image information; detecting whether the background image is stable; and performing encoding switching between a background-based encoding method and a non-background encoding method based at least in part on the detection.

According to another embodiment, a system for hybrid video encoding includes: a background modeling module configured to extract a background image based at least in part on image information; a background detection module configured to detect whether the background image is stable; an encoding switching module configured to perform encoding switching between a background-based encoding method and a non-background encoding method based at least in part on the detection; and an encoder configured to perform encoding operations based at least in part on an encoding-switching command from the encoding switching module.

According to yet another embodiment, a system for hybrid video encoding includes: one or more data processors; and one or more non-transitory computer-readable storage media encoded with instructions for commanding the data processors to execute certain operations. The operations include: acquiring image information; extracting a background image based at least in part on the image information; detecting whether the background image is stable; and performing encoding switching between a background-based encoding method and a non-background encoding method based at least in part on the detection.

According to yet another embodiment, a non-transitory computer-readable storage medium is encoded with instructions for commanding one or more processors to execute a method for hybrid video encoding. The method comprises: acquiring image information; extracting a background image based at least in part on the image information; detecting whether the background image is stable; and performing encoding switching between a background-based encoding method and a non-background encoding method based at least in part on the detection.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
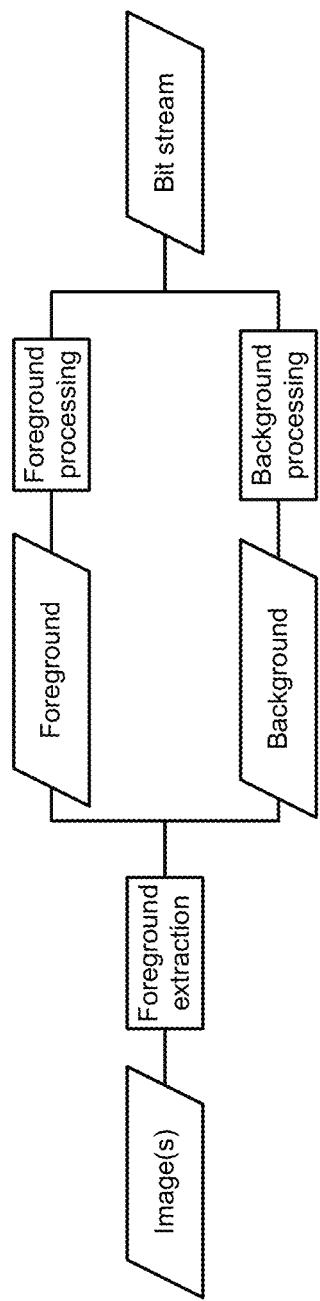
FIG. 1 is an example diagram showing structured video encoding based on foreground/background segregation.

FIG. 1 is an example diagram showing structured video encoding based on foreground/background segregation. As shown in FIG. 1, in the structured encoding process based on foreground/background segregation, an original image is divided into foreground and background through a background reconstruction technique. Foreground and background have different degrees of importance, and are respectively processed during encoding and formed into a bit stream after encoding.

The scheme as shown in FIG. 1 is mainly applied to monitoring stationary images. However, for a dynamic camera, the orientation and the focal length of a monitoring screen changes, and the background changes accordingly. If the foreground and the background are used for encoding, the bit rate may increase. Moreover, the referenced background may expire, and the encoding quality may suffer, so that semi-structured encoding may not be achieved.

Figure 2:
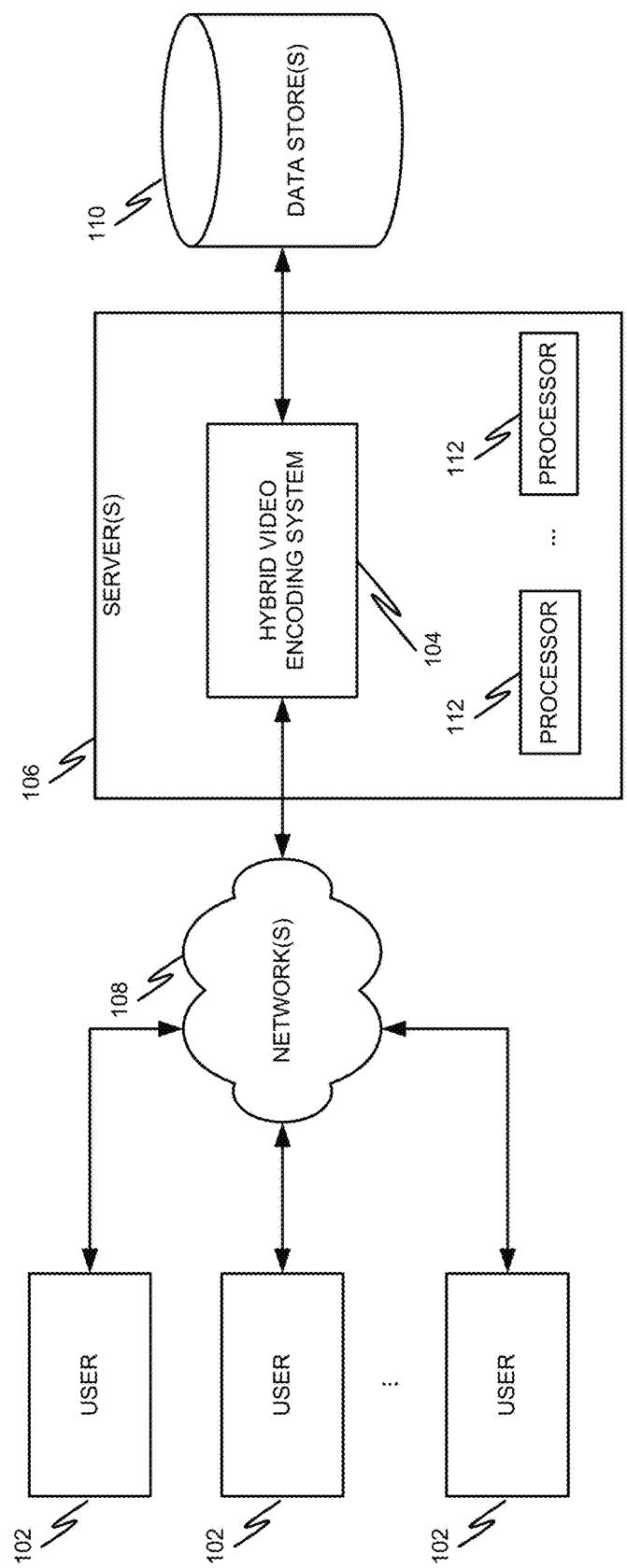
FIG. 2 is an example computer-implemented environment wherein users can interact with a hybrid video encoding system hosted on one or more servers through a network, according to one embodiment of the present invention.

FIG. 2 is an example computer-implemented environment wherein users 102 can interact with a hybrid video encoding system 104 hosted on one or more servers 106 through a network 108, according to one embodiment of the present invention. As shown in FIG. 2, the users 102 can interact with the hybrid video encoding system 104 through a number of ways, such as over one or more networks 108. One or more servers 106 accessible through the network(s) 108 can host the hybrid video encoding system 104. The one or more servers 106 can also contain or have access to one or more data stores 110 for storing data for the hybrid video encoding system 104. The one or more servers 106 implement one or more data processors 110. For example, the data processors 110 can be configured for parallel computing. The hybrid video encoding system 104 can assist the users 102 to implement hybrid encoding based on encoding switching as described herein.

Figure 3:
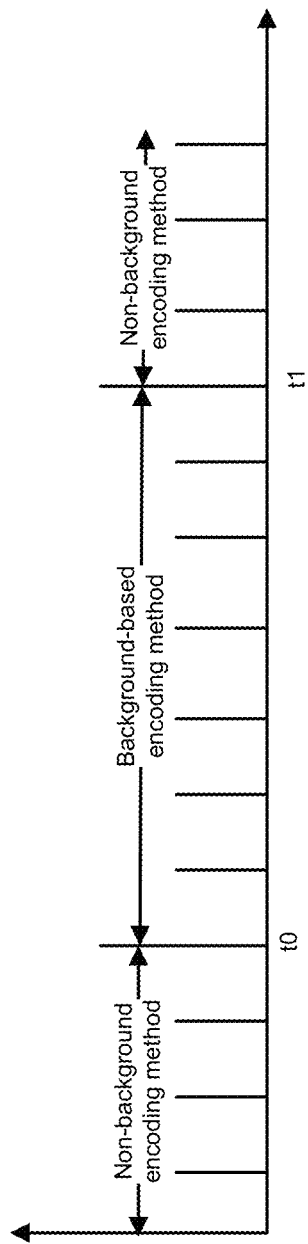
FIG. 3 is an example diagram showing hybrid video encoding based on encoding switching according to one embodiment of the present invention.

FIG. 3 is an example diagram showing hybrid video encoding based on encoding switching according to one embodiment of the present invention. As shown in FIG. 3, hybrid video encoding combines a background-based encoding method (e.g., a background-segregation encoding method) and a non-background encoding method through encoding switching. The background-segregation encoding method is based on background segregation and adopts a structured encoding technique using background and foreground.

Figure 4:
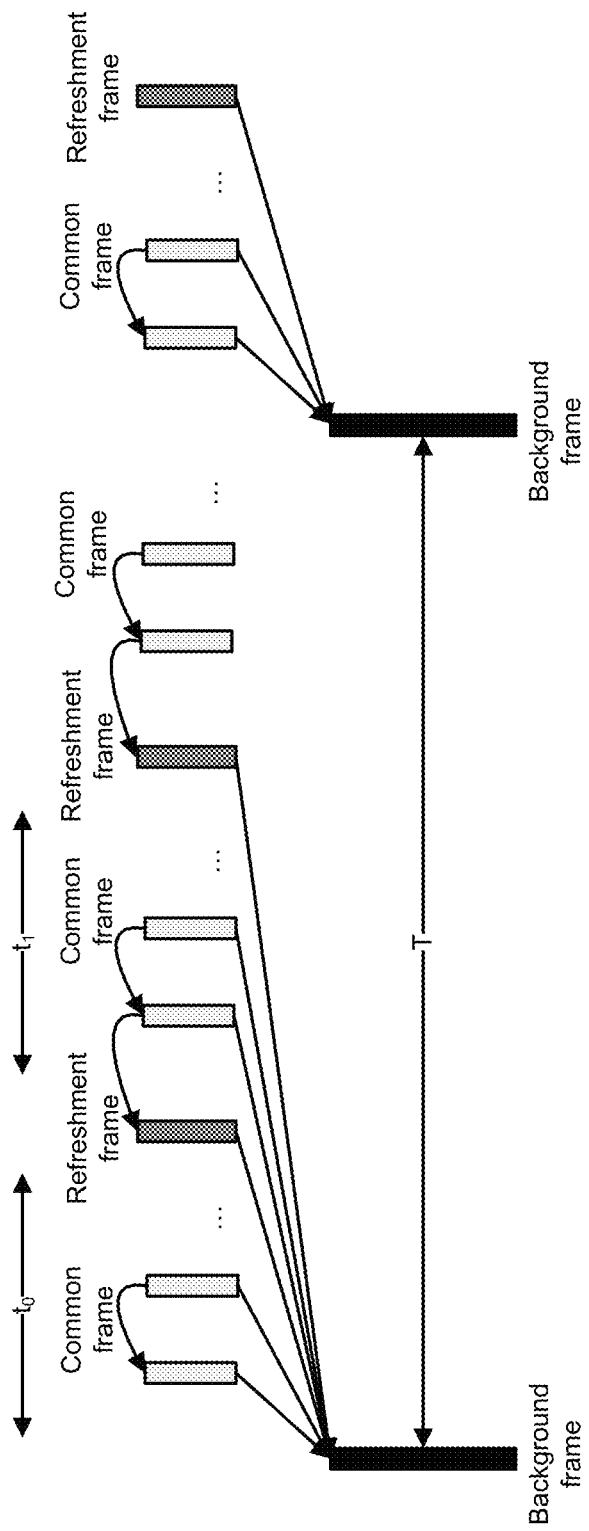
FIG. 4 is an example diagram showing reference relation of coding frames for a background-segregation encoding method according to one embodiment of the present invention.

FIG. 4 is an example diagram showing reference relation of coding frames for a background-segregation encoding method according to one embodiment of the present invention. As shown in FIG. 4, for the background-segregation encoding method, coding frames include three types, namely, background frames, refreshment frames and common frames. A background frame is used, compared with conventional coding techniques. A background frame is extracted through background analysis. A refreshment frame is obtained when the encoder encodes an input video image, and encoding refreshment frames is similar to P frame encoding in H.264. Only one or more background frames are referred to during encoding of refreshment frames. Encoding of a common frame is similar to P frame encoding in H.264, and both a preceding frame and a background frame are referred to when a common frame is encoded.

Figure 5:
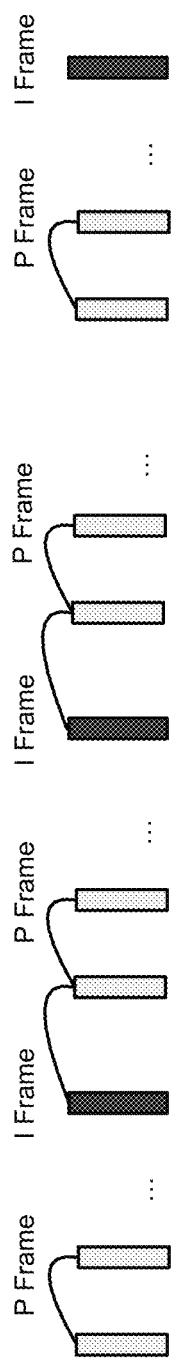
FIG. 5 is an example diagram showing reference relation of coding frames for a non-background encoding method according to one embodiment of the present invention.

FIG. 5 is an example diagram showing reference relation of coding frames for a non-background encoding method according to one embodiment of the present invention. The non-background encoding method can be any known encoding method, such as, MPEG-1, MPEG-2, MPEG-4, H.261, H.263, H.264, etc.

Referring back to FIG. 3, when the encoding process starts, a stable background has not been established, and the non-background encoding method is used. At to, a stationary background image is detected, and the encoding process switches from the non-background encoding method to the background-segregation encoding method. At t1, a stationary background image may not be detected, and the background-segregation encoding method switches to the non-background encoding method.

Figure 6:
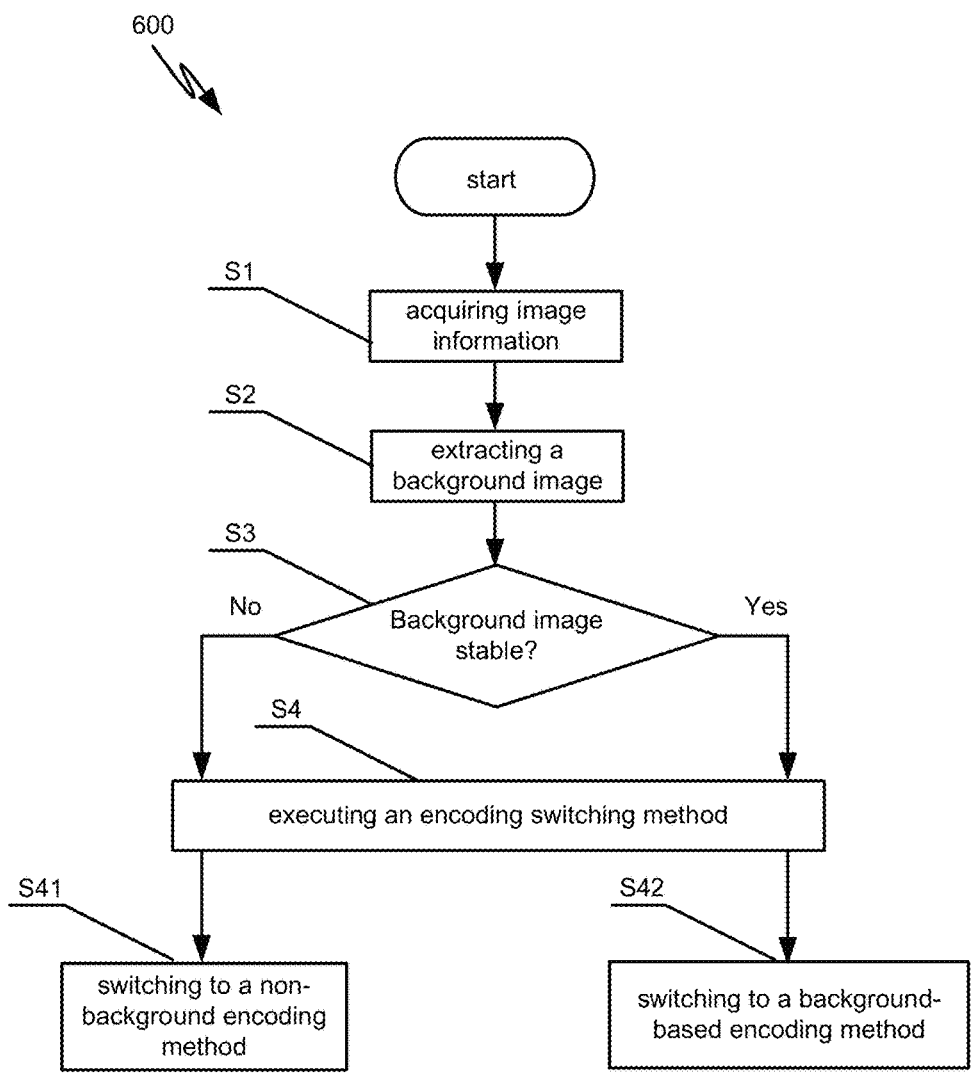
FIG. 6 is an example flow diagram showing a method for hybrid video encoding based on encoding switching according to one embodiment of the present invention.

FIG. 6 is an example flow diagram showing a method for hybrid video encoding based on encoding switching according to one embodiment of the present invention. As shown in FIG. 6, whether a stable background image exists (e.g., corresponding to t0 and t1 as shown in FIG. 3) is judged in real time through a mode-switch method. If a stable background image exists (e.g., at t0), the background-segregation encoding method is used. If no stable background image (e.g., at t1) exists, the non-background encoding method is used. The stable background image corresponds to a stationary background image or a background image with a variation range (e.g., corresponding to one or more thresholds).

The method 600 comprises multiple processes. For example, the process Si includes acquiring image information. The image information of one or more monitoring scenes is acquired by a camera, and is input to a mode-switching device in a video processing device. For example, the image information includes PTZ coordinates of the background image in the monitoring video, a real-time bit rate, a confidence degree, frame difference images, etc. The process S2 includes extracting a background image. The acquired image information is encoded using a background-segregation encoding method. Foreground and background images based on the image information are extracted through background modeling.

The process S3 includes detecting whether the background image is stable. For example, whether a stable background image exists is determined in real time through detecting and analyzing the background image information in image information. A stable background image indicates that there is no obvious change in the monitoring area, so that the background image in the acquired image information remains stable or stationary. Detected background image information includes but not limited to PTZ coordinates of the background image, a real-time bit rate, a confidence degree, background frame information, etc.

The process S4 includes executing an encoding switching method according to the detection result of the process S3 to switch between the background-segregation encoding method and the non-background encoding method. Depending on whether a stable background image is detected, the encoding switching method is executed to switch between the background-segregation encoding method and the non-background encoding method. The encoding switching method comprises the following two processes: the process S41 of switching to the background-segregation encoding method when a stable background image is detected; and the process S42 of switching to the non-background encoding method when a stable background image is not detected.

Referring to back to FIG. 3, when encoding starts, since a stable background has not been established yet, the non-background encoding method is used. At t0, if a stable background is detected, the encoding process switches from the non-background encoding method to the background-segregation encoding method. At t1, a stable background may not be detected, and the encoding process switches back to the non-background encoding method.

Figure 7:
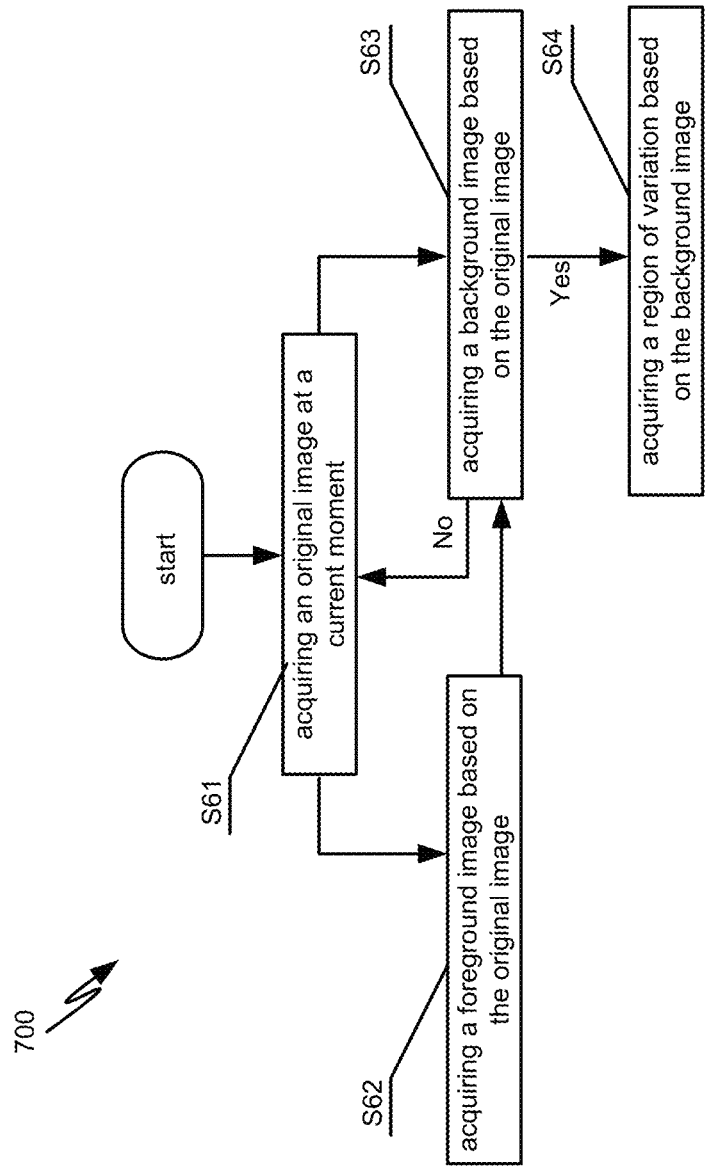
FIG. 7 is an example flow diagram for a background-segregation encoding method according to one embodiment of the present invention.

FIG. 7 is an example flow diagram for a background-segregation encoding method according to one embodiment of the present invention. As shown in FIG. 7, a background-segregation encoding method 700 includes multiple processes. For example, the background-segregation encoding method 700 is used in the process S2 and the process S4 as shown in FIG. 6.

The process S61 includes acquiring an original image at a current moment. Before encoding, the original image information of an image frame at the current moment may be acquired. For example, down-sampling can be conducted for the original image to obtain a low resolution image to facilitate subsequent foreground extraction and background extraction.

The process S62 includes acquiring a foreground image based on the original image. Background modeling is conducted for the low resolution image. The foreground image that includes only a moving object can be obtained in real time through background modeling. As an example, the background modeling can adopt, but not limited to, a mixed Gaussian method.

The process S63 includes acquiring a background image based on the original image. The process S63 can be executed through the following operations: The operation S631 includes comparing frame difference images of two frames (e.g., a preceding frame, the current frame or a next frame). The operation S632 includes determining whether the current frame image is a stable image (or a stationary image) not containing foreground information (e.g., the moving object). The operation S633 includes, if the current frame image is a stable image (or a stationary image) that does not contain foreground information, designating the current frame image as the background image. The operation S634 includes, if the current frame image is not a stable image (or a stationary image) that does not contain foreground information, obtaining original image information of an original image at a next moment for further processing. In some embodiments, the process S63 further includes the operation S635 that includes: designating the current frame image as the background frame and inputting the background frame to the encoder. For example, a background modeling module outputs a sign that the current frame image can be taken as the background image, and the encoder takes the current frame as the background frame to encode the current frame into the bit stream.

The process S64 includes: acquiring a region of variation of the current frame relative to the background image based on the background image. For example, the background modeling module uses the detected stationary image as the background image, subtracts the background image from the real time image of each frame, and acquires the region of variation. Further, the background modeling module performs connected domain analysis and/or morphological operations on the region of variation to output in real time a foreground area relative to the background frame.

If the background image is unstable, a clean background frame may not be extracted. If the background-segregation encoding method is still adopted, due to incorrect referenced background frame, quality of the encoded image is reduced, and the bit rate may not be saved. Thus, the hybrid encoding method based on encoding switching is adopted in the process S4 and the process S5. When a stationary background image is not detected, the encoding process switches from the background-segregation encoding method to the non-background encoding method. This way, the hybrid encoding method that combines the background-segregation encoding method with the non-background encoding method can be applied to any cameras, such as a rotating dome camera, and is not limited to stationary cameras, thereby extending the application of the hybrid encoding method.

Figure 8:
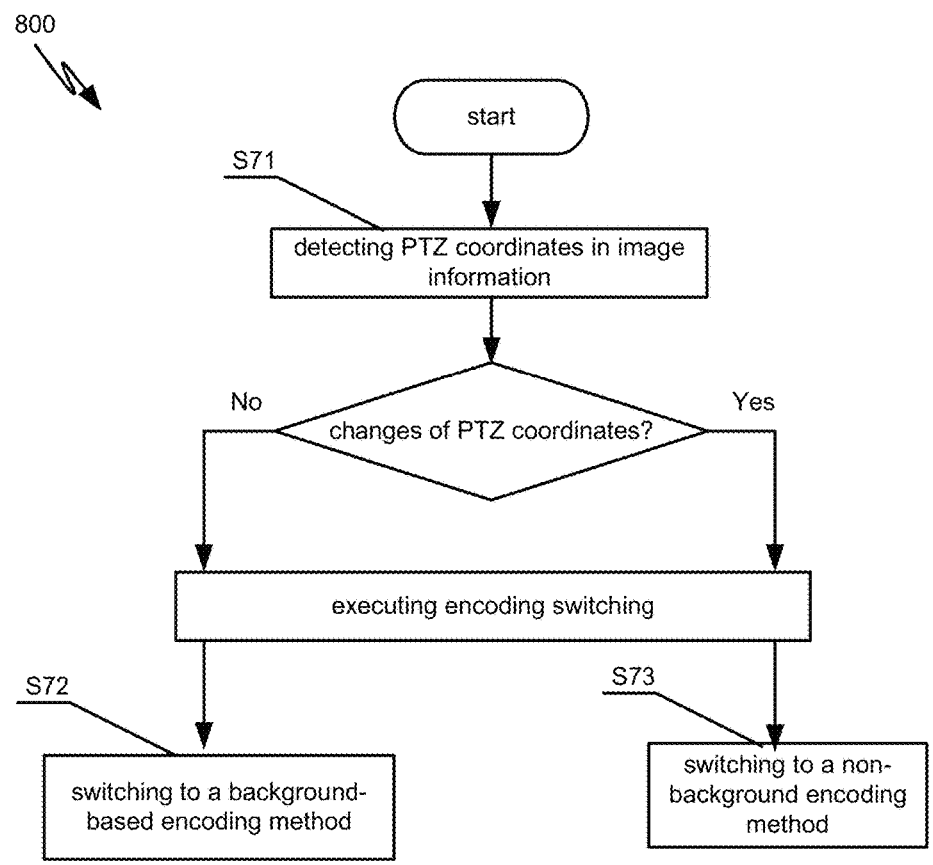
FIG. 8 is an example flow diagram for the encoding switching method based on PTZ coordinates according to one embodiment of the present invention.

FIG. 8 is an example flow diagram for the encoding switching method based on PTZ coordinates according to one embodiment of the present invention. For example, PTZ coordinates of image information can be used as reference for detecting whether the background image is stable. PTZ is the abbreviation of Pan/Tilt/Zoom in security monitoring applications, and indicates parameter variation of omnidirectional (left/right/up/down) movement and zoom control of a camera.

As shown in FIG. 8, the encoding switching method 800 based on PTZ coordinates comprises multiple processes. The process S71 includes: detecting PTZ coordinates in image information. For example, a dynamic camera, e.g., a dome camera, has PTZ coordinates which change with the movement of the dynamic camera. The PTZ coordinates of the camera may be recorded in real time.

The process S72 includes: if no change of PTZ coordinates is detected, adopting the background-segregation encoding method. The execution of the process S72 includes two conditions. A first condition is that the camera itself does not have PTZ coordinates, and thus no PTZ coordinate information can be detected. The background-segregation encoding method may be implemented as a default option or other types of encoding methods may be triggered, which is described in detail below. A second condition is that the camera has PTZ coordinates, but the camera remains stationary. Therefore, the detected PTZ coordinates have no change, and the background-segregation encoding method may be implemented as the default option until a change of the PTZ coordinates is detected.

The process S73 includes: when a change of PTZ coordinates is detected, switching to the non-background encoding method. When the change of PTZ coordinates is detected, the encoding process switches from the background-segregation encoding method to the non-background encoding method.

In some embodiments, the encoding switching method based on PTZ coordinates can be independently executed as the background-segregation encoding method. In certain embodiments, information associated with the PTZ coordinates can be supplemental information for the encoding switching method based on a background model which is described in detail below. That is, if no change of PTZ coordinates is detected in the process S72, an encoding switching method based on a background model may be triggered.

Figure 9:
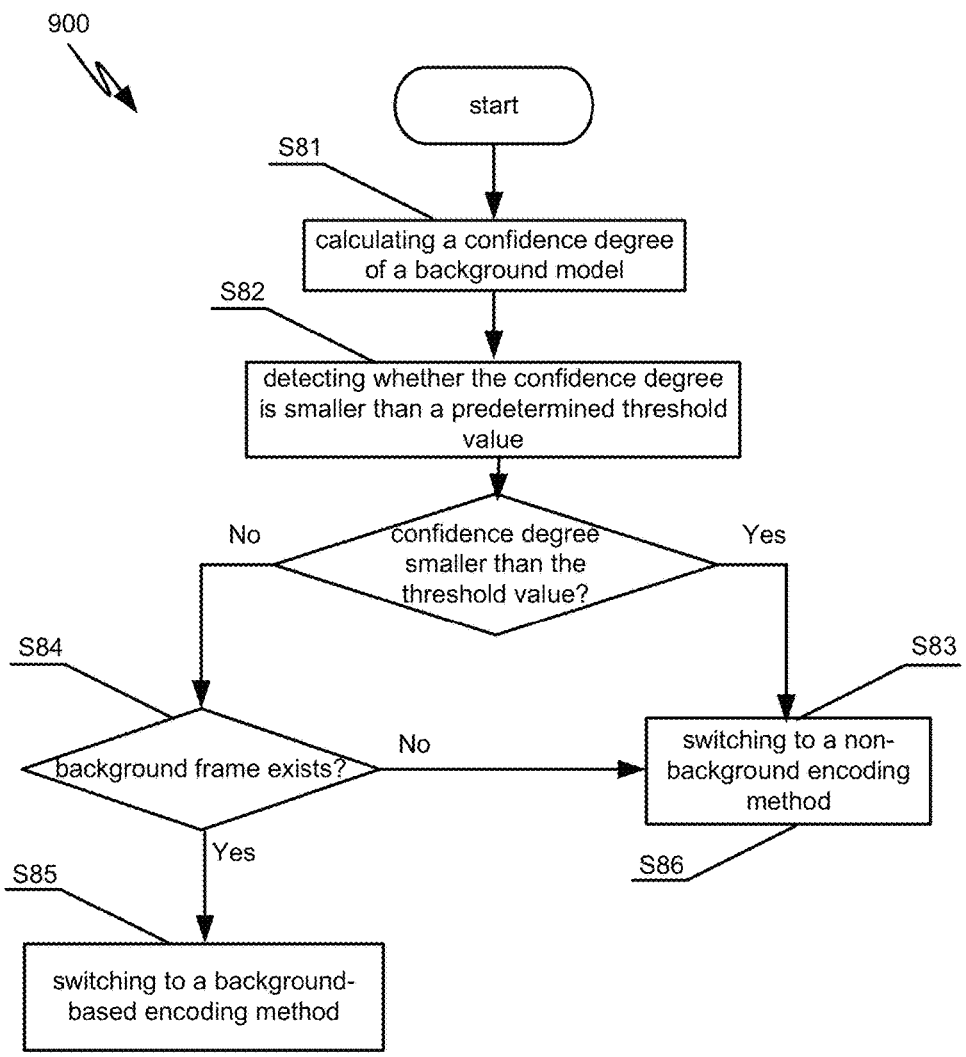
FIG. 9 is an example flow diagram for an encoding switching method based on a background model according to one embodiment of the present invention.

FIG. 9 is an example flow diagram for an encoding switching method based on a background model according to one embodiment of the present invention. For example, the encoding switching method 900 is based on a background model and adopts one or more confidence degrees and frame information of a background frame in the background model as reference to detect whether the background image is stable. The encoding switching method 900 includes multiple processes.

The process S81 includes calculating one or more confidence degrees of a background model. For example, since the creation process of a background image is often influenced by a moving object in the scenario, if the moving object stays in the scenario longer than the background appearing at the position of the moving object. That is, the real background at the position of the moving object is covered, and the moving object can be regarded as background. Thus, the background image created at this time may not be clean, and some pixel values of the moving object exist in the background image. To reduce the influence of the moving object on the background image, a confidence degree (i.e., a degree of reliability) of the background model may be calculated in the creation process of the background image. The confidence degree indicates the historical movement information of the background model. The larger the confidence degree is, the more stable and reliable the background image at the position is. Then the background-segregation encoding method can be adopted.

In certain embodiments, the confidence degree of the background model can adopt a macro-block confidence degree or a whole-frame confidence degree. The macro-block confidence degree may correspond to a confidence degree of a background macro block in the background model, and indicate the historical movement information at the position of the background macro block. The macro-block confidence degree is calculated based on macro blocks. A macro block is at the pixel level, and can include one pixel or N pixels (e.g., N is an integer). As an example, the macro-block confidence degree can be calculated according to $(1-n/1500)*255$, where n represents a number of frames. The whole-frame confidence degree corresponds to a confidence degree of the entire background frame. The whole-frame confidence degree is obtained through calculating, in a background-confidence-degree image, the proportion of macro blocks of which confidence degrees are greater than a threshold value th (e.g., 200). For example, the whole-frame confidence degree is calculated based on the whole background image. The macro block is at pixel-level, and the whole frame is at image level. The whole-frame confidence degree is based on the macro-block confidence degree, and corresponds to a statistical value associated with confidence degree values of large macro blocks. In some embodiments, a macro-block confidence degree may be used to determine whether a macro block is reliable. A whole-frame confidence degree can be used to determine whether the whole background image is reliable.

The process S82 includes: detecting whether a confidence degree is smaller than a predetermined threshold value. The confidence degree of a background model can be used to determine the stability of the background image. The larger the confidence degree, the more reliable the background at the position is. The smaller the confidence degree (e.g., smaller than a predetermined threshold value), the less stable the background image at the position may be. For example, the monitoring screen has obvious changes. At this time, the background-segregation encoding method may not be adopted, and may be switched to the non-background encoding method.

As an example, if a background macro block does not have any movement in the past 1500 frames, the confidence degree of the background macro block is 255 (e.g., a maximum value). If the background macro blocks of n frames within 1500 frames move, the macro-block confidence degree can be calculated as $(1-n/1500)*255$. The larger the confidence degree is, the more reliable the background at the position is. Upon encoding, the macro-block confidence degree can be used to determine whether the background macro block can be referenced.

The process S83 includes: if the confidence degree is smaller than the predetermined threshold value, switching to the non-background encoding method. If the confidence degree of the background model is smaller than the predetermined threshold value, a clean background model may not be acquired. A stable background image may not exist, and subsequent background frame detection may be disturbed. Then the encoding process switches to the non-background encoding method.

The process S84 includes: if the confidence degree is not smaller than the predetermined threshold value, detecting whether a background frame exists. If the background model confidence degree is higher than or equal to the predetermined threshold value, then a stable background image may exist. Background frame detection can be made and used for further determination. For example, the background frame detection includes: analyzing a foreground image and a frame difference image in the foreground and background segregation process; acquiring (e.g., based on statistical analysis) foreground points and frame difference points for each frame. If there is a stationary image satisfying point conditions within a predetermined time period, a background frame is detected. Then, a background-existence sign may be output and the background-segregation encoding method is used.

The process S85 includes: if the background frame is detected, switching to the background-segregation encoding method. For example, when the background frame is detected, the background-existence sign may be output and the background-segregation encoding method is used. The process S86 includes: if a background frame is not detected, switching to the non-background encoding method.

Figure 10:
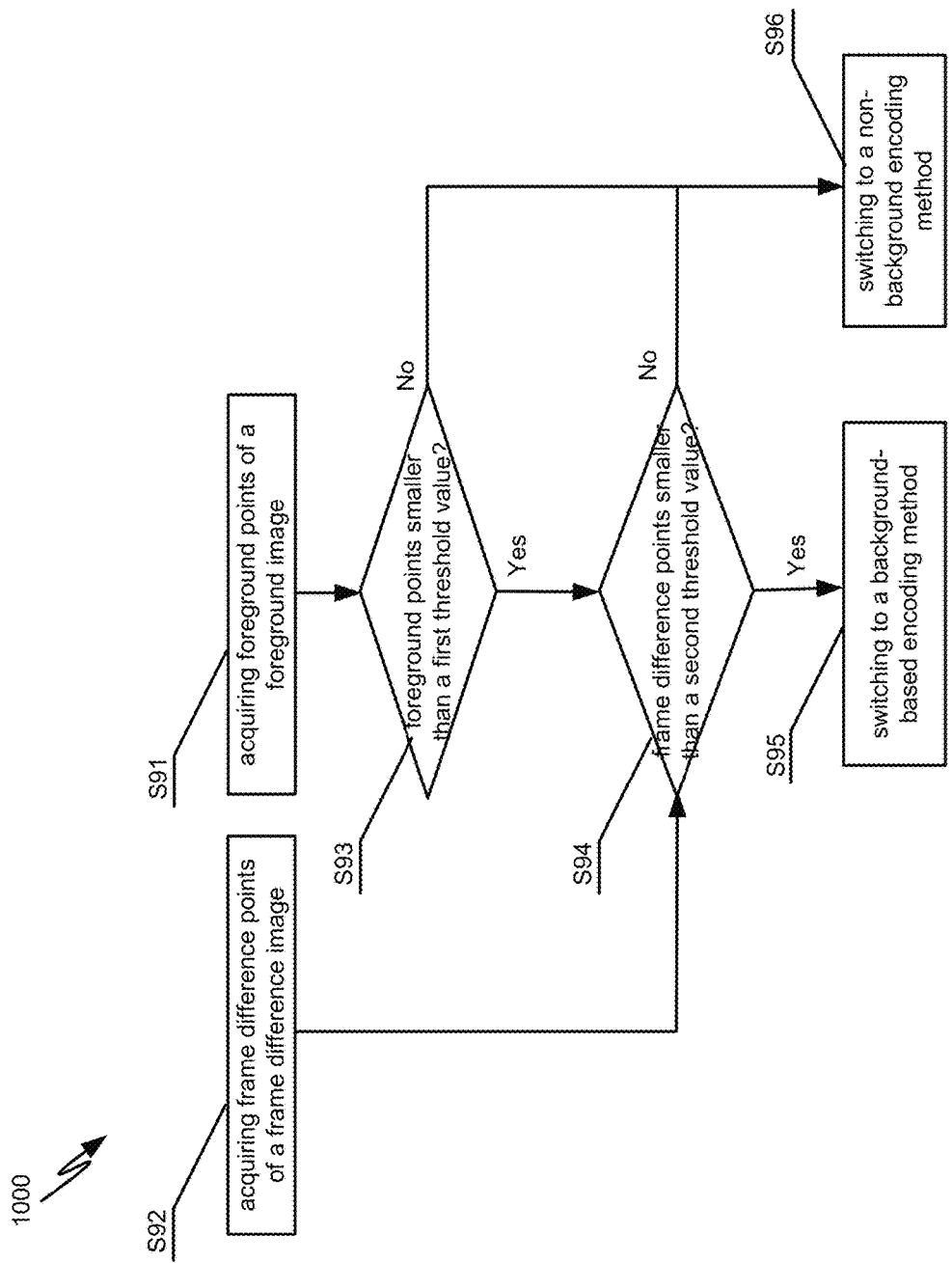
FIG. 10 is an example flow diagram for background frame detection according to one embodiment of the present invention.

FIG. 10 is an example flow diagram for background frame detection according to one embodiment of the present invention. As shown in FIG. 10, the process S84 is executed to detect whether a background frame exists. The process S84 includes multiple operations.

The operation S91 includes: acquiring foreground points of a foreground image. For example, a foreground image and a frame difference image from foreground background segregation of the current image to acquire the foreground points of the foreground image. The operation S92 includes: acquiring frame difference points of a frame difference image. For example, the foreground image and the frame difference image from foreground background segregation of the current image to obtain frame difference points of the frame difference image. In some embodiments, the operation S91 and the operation S92 may be executed in sequence or simultaneously.

The operation S93 includes: detecting within a predetermined time period whether one or more image frames of which foreground points are smaller than a first threshold value exist. Within the predetermined time period, whether one or more image frames of which foreground points are smaller than a first threshold value exist is detected. If there are one or more image frames of which foreground points are smaller than the first threshold value, a next operation is executed. Then, whether these image frames that satisfy the conditions include one or more image frames of which frame difference points are smaller than a second threshold value may be detected.

The operation S94 includes: detecting within a predetermined time period whether one or more image frames of which frame difference points are smaller than the second threshold value. Within the predetermined time period, among the image frames of which the foreground points are smaller than the first threshold value, whether one or more image frames of which frame difference points are smaller than the second threshold value exist is detected.

In some embodiments, the operation S93 and the operation S94 may be executed in sequence or simultaneously. For example, the operation S94 can be executed first. That is, whether one or more image frame of which foreground points are smaller than the first threshold value exist among image frames of which frame difference points are smaller than the second threshold value can be detected.

The operation S95 includes: if within the predetermined time period, one or more image frames of which foreground points are smaller than the first threshold value and frame difference points are smaller than the second threshold value are detected, switching to the background-segregation encoding method. If a stationary image that satisfy the conditions is detected within the predetermined time period, a background frame is detected. Then a background-existence sign may be output and the background-segregation encoding method is used.

The operation S96 includes: if no image frame of which foreground points are smaller than the first threshold value and frame difference points are smaller than the second threshold value is detected within the predetermined time period, switching to the non-background encoding method. If a stationary image that satisfies the conditions is not detected within the predetermined time period, then there is no stationary image can be used as a background frame. The monitoring scene may have changed obviously during the time period, then the non-background encoding method rather than the background-segregation encoding method is used. After expiration of the predetermined time period, the process returns, and the above-noted operations are executed again within a next predetermined time period.

Figure 11:
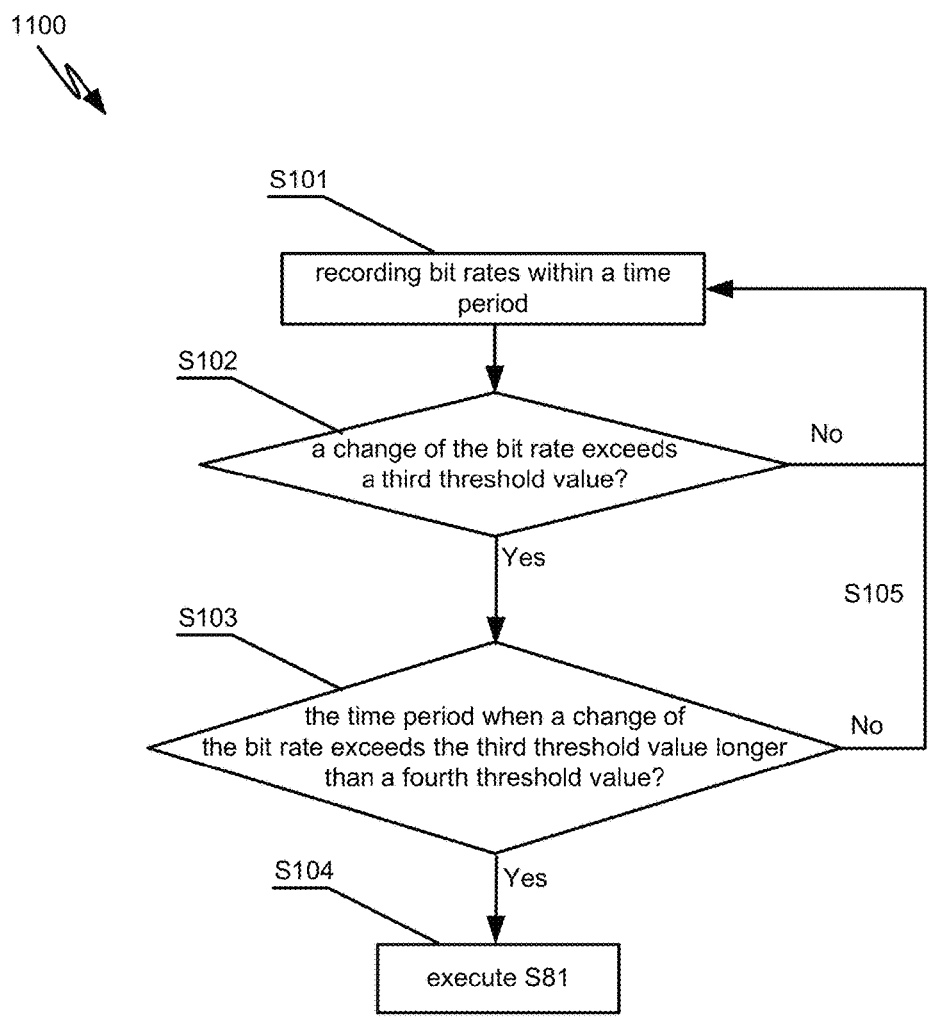
FIG. 11 is an example flow diagram for an encoding switching method based on sudden bit-rate changes according to one embodiment of the present invention.

FIG. 11 is an example flow diagram for an encoding switching method based on sudden bit-rate changes according to one embodiment of the present invention. As shown in FIG. 11, the real-time bit rate is monitored during a monitoring encoding process to implement encoding switching. The encoding switching method 1100 comprises multiple processes.

The process S101 includes: recording bit rates within a time period. Real-time statistics of the bit rate values within a time period (for example, bit rate values of the latest 25 frames) can be recorded, and a bit rate curve with bit rate values and time as coordinates can be generated so as to detect whether the bit rate curve varies suddenly.

The process S102 includes: detecting whether a change of the bit rates between consecutive times exceeds a third threshold value. When a sudden change of the bit rates between consecutive times is detected, whether the change exceeds the predetermined third threshold value. If the change exceeds the predetermined third threshold value, a next process is executed. If the change does not exceed the predetermined third threshold value, the process S101 is executed to continue to record and detect changes of the bit rate.

The process S103 includes: detecting whether the time period during which the change of the bit rates exceeds the third threshold value is longer than a fourth threshold value. When the change between consecutive times that exceeds the predetermined third threshold value is detected, it is further detected whether the time period during which the change of the bit rates exceeds the third threshold value is longer than the fourth threshold value.

The process S104 includes: if the time period during which the change of the bit rates exceeds the third threshold value is longer than a fourth threshold value, executing the encoding switching method based on the background model (e.g., as shown in FIG. 9).

The process S105 includes: if the time period during which the change of the bit rates exceeds the third threshold value is not longer than a fourth threshold value, returning to the process S101 to continue to record and detect changes of the bit rate.

In certain embodiments, the encoding switching method 1100 can be executed as the background-segregation encoding method. In some embodiments, the method 1100 can be regarded as an auxiliary process to the background-segregation encoding method to trigger the encoding switching method based on the background model. That is, the method 1100 can be executed before the encoding switching method based on the background model to trigger the encoding switching method based on the background model when certain conditions are satisfied so as to make detection of the background image more accurate. In specific embodiments, the bit rate monitoring may not be executed, and the encoding switching method based on the background model can be directly triggered.

In sum, the hybrid encoding method based on encoding switching includes detection for encoding switching throughout the entire encoding process. As shown in FIG. 5, when the background-segregation encoding method is adopted, if no stable background frame is detected, the encoding process switches to the non-background encoding method. When the non-background encoding method is adopted, if one or more stable background frames are detected, the encoding process switches to the background-segregation encoding method. The hybrid encoding method can solve the application bottleneck problem of the background-segregation encoding method to ensure quality and achieve bit rate savings.

Figure 12:
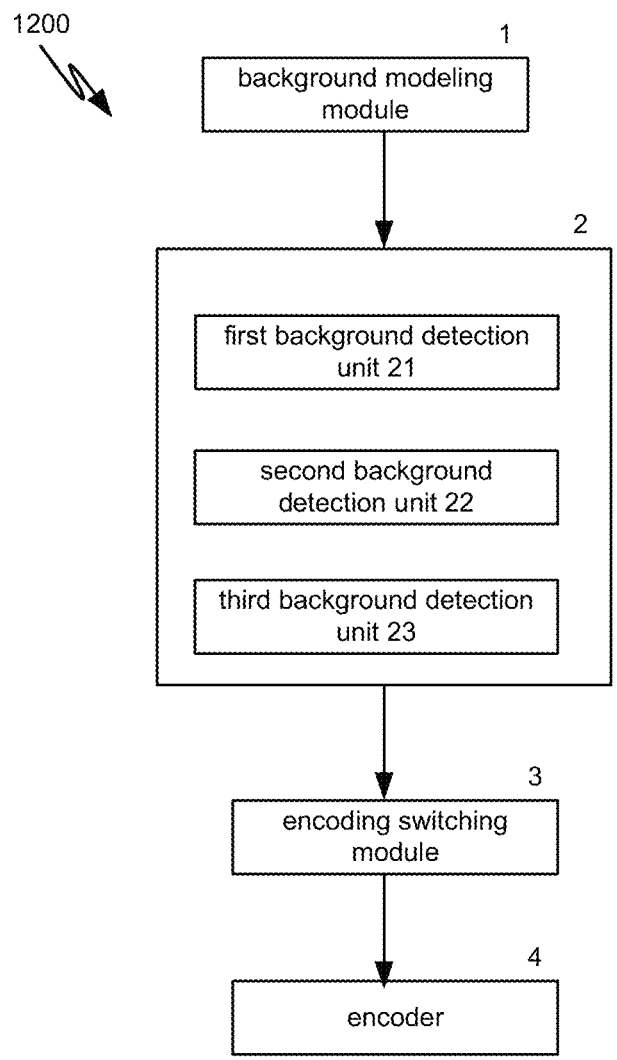
FIG. 12 is an example diagram for a hybrid encoding system based on encoding switching according to one embodiment of the present invention.

FIG. 12 is an example diagram for a hybrid encoding system based on encoding switching according to one embodiment of the present invention. As shown in FIG. 12, the hybrid encoding system 1200 based on encoding switching comprises a background modeling module 1, a background detection module 2, an encoding switching module 3 and an encoder 4.

The background modeling module 1 is configured to extract a background image in acquired image information. Specifically, the background modeling module 1 encodes the acquired image information using a background-segregation encoding method and extracts foreground and background images based on the image information through background modeling.

The background detection module 2 (e.g., connected to the background modeling module 1) is configured to detect whether a background image is stable and send a stable-background signal or an unstable-background signal. The stable-background signal indicates that a stable background image is detected and the unstable-background signal indicates no stable background is detected. The background detection module 2 determines whether a stable background image exists in real time through detecting and analyzing the background image information in image information. A stable background image indicates that there is no obvious change in the monitoring area, so that the background image in the acquired image information remains stable or stationary. Detected background image information includes but not limited to PTZ coordinates of the background image, a real-time bit rate, a confidence degree, background frame information, etc.

In some embodiments, the background detection module 2 comprises a first background detection unit 21, a second background detection unit 22 and/or a third background detection unit 23. For example, the first background detection unit 21 performs background detection based on confidence degrees of the background model and background frames. The second background detection unit 22 performs background detection based on PTZ coordinates. The third background detection unit 23 performs background detection based on bit rates. In some embodiments, the second background detection unit 22 and the third background detection unit 23 are optional and are configured to assist the first background detection unit 21 to make background detection so as to improve detection accuracy.

The encoding switching module 3 (e.g., connected to the background detection module 2) is configured to perform encoding switching operation between the background-segregation encoding method and the non-background encoding method according to detection results of the background detection module 2. Specifically, when the background detection module 2 detects a stable background image, a stable-background signal is sent to the encoding switching module 3. The encoding switching module 3 then sends an encoding method switch command to the encoder 4 to switch to the background-segregation encoding method. When the background detection module 2 does not detect any stable background image, an unstable-background signal is sent to the encoding switching module 3. The encoding switching module 3 then sends an encoding method switch command to the encoder 4 to switch to the non-background encoding method. The non-background encoding method can be any known encoding method, such as, MPEG-1, MPEG-2, MPEG-4, H.261, H.263, H.264, etc.

The encoder 4 (e.g., connected to the encoding switching module 3) is configured to receive the encoding method switch command sent by the encoding switching module 3 and execute corresponding encoding operations according to the encoding method switch command.

Figure 13:
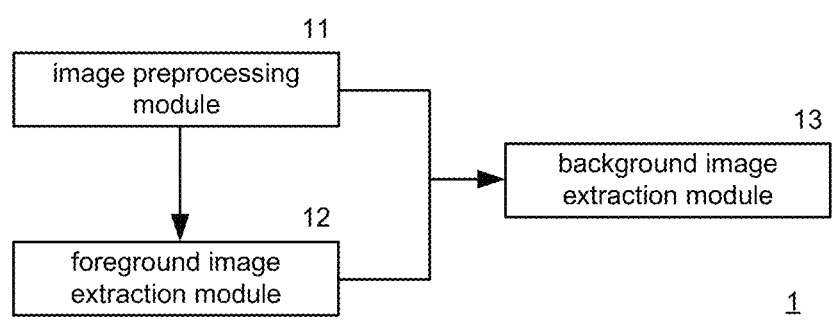
FIG. 13 is an example diagram showing a background modeling module according to one embodiment of the present invention.

FIG. 13 is an example diagram showing a background modeling module according to one embodiment of the present invention. As shown in FIG. 13, the background modeling module 1 further comprises an image preprocessing module 11, a foreground image extraction module 12 and a background image extraction module 13.

The image preprocessing module 11 is configured to preprocess the acquired original image to get image formats that satisfy certain conditions. For example, the image processing module 11 executes down-sampling for the acquired original image to obtain a low resolution image to facilitate subsequent foreground extraction and background extraction.

The foreground image extraction module 12 (e.g., connected to the image preprocessing module 11) is configured to perform background modeling for the low-resolution image after preprocessing and obtain in real time through background modeling a foreground image that includes only a moving object. As an example, the background modeling can adopt, but not limited to, a mixed Gaussian method.

The background image extraction module 13 (e.g., connected to the image preprocessing module 11 and the foreground image extraction module 12) is configured to extract a background image from the preprocessed low-resolution image using the foreground image. For example, the background image extraction module 13 extracts a stable image (or a stationary image) that does not include foreground information (e.g., a moving object) as the background image.

Figure 14:
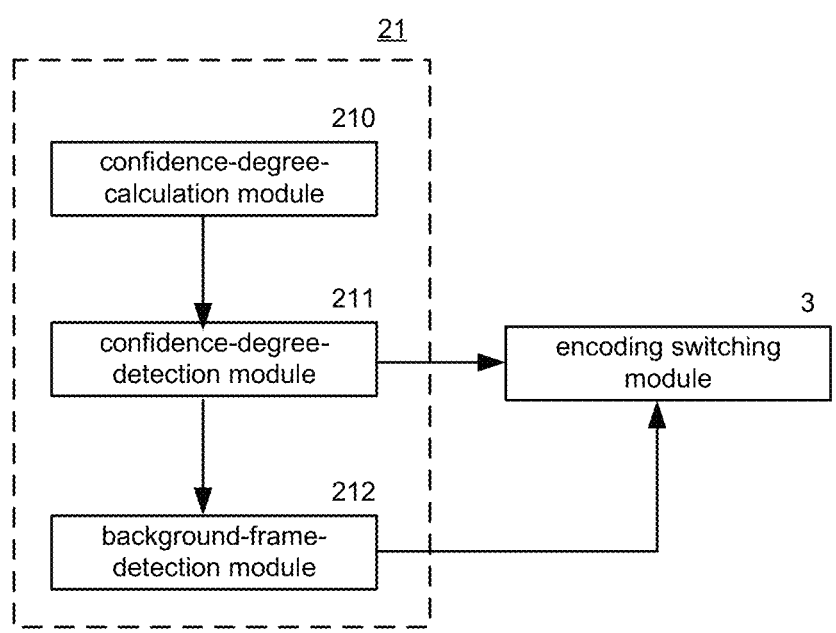
FIG. 14 is an example diagram showing a first background detection unit according to one embodiment of the present invention.

FIG. 14 is an example diagram showing a first background detection unit according to one embodiment of the present invention. As shown in FIG. 14, the first background detection unit 21 is configured to perform encoding switching operations based on the background model and detect whether a stable background image exists based on confidence degrees of the background model and background frames. The first background detection unit 21 further comprises a confidence-degree-calculation module 210, a confidence-degree-detection module 211 and/or a background-frame-detection module 212.

The confidence-degree-calculation module 210 is configured to calculate one or more confidence degrees of a background model and send the confidence degrees to the confidence-degree-detection module 211. Specifically, the confidence-degree-calculation module 210 calculates a confidence degree (i.e., a degree of reliability) of the background model in the creation process of the background image. The confidence degree indicates the historical movement information of the background model. The larger the confidence degree is, the more stable and reliable the background image at the position is. Then the background-segregation encoding method can be adopted.

In some embodiments, the confidence degree of the background model can use a macro-block confidence degree or a whole-frame confidence degree. A macro-block confidence degree represents the confidence degree of a background macro block in the background model and historical movement information of the background macro block. A whole-frame confidence degree represents the confidence degree of the entire background frame. The whole-frame confidence degree is obtained through calculating, in a background-confidence-degree image, the proportion of macro blocks of which confidence degrees are greater than a threshold value th (e.g., 200), to determine whether the entire background image is reliable.

The confidence-degree-detection module 211 (e.g., connected to the confidence-degree-calculation module 210) is configured to detect whether a confidence degree is smaller than a predetermined threshold value. Specifically, when the confidence-degree-detection module 211 detects that the confidence degree is smaller than the predetermined threshold value, an unstable-background signal is sent to the encoding switching module 3. The encoding switching module 3 then sends an encoding method switch command to the encoder 4 to switch to the non-background encoding method. When the confidence-degree-detection module 211 detects that a confidence degree is not smaller than a predetermined threshold value, a background-frame-detection command is sent to the background-frame-detection module 212 which is triggered to execute one or more background frame detection operations.

The background-frame-detection module 212 (e.g., connected to the confidence-degree-detection module 211) is configured to detect whether there is a background frame. Specifically, when the background-frame-detection module 212 receives a background-frame-detection command sent by the confidence-degree-detection module 211, a background frame detection operation is performed to detect whether there is a background frame. When the background-frame-detection module 212 detects a background frame, a stable-background signal is sent to the encoding switching module 3. The encoding switching module 3 sends an encoding method switch command to the encoder 4 to switch to the background-segregation encoding method. When the background-frame-detection module 212 does not detect a background frame, an unstable-background signal is sent to the encoding switching module 3. The encoding switching module 3 sends an encoding method switch command to the encoder 4 to switch to the non-background encoding method.

Figure 15:
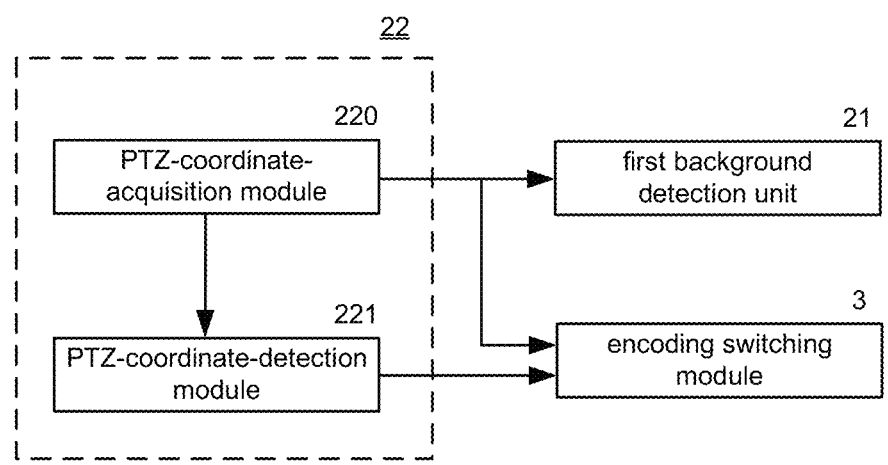
FIG. 15 is an example diagram showing a second background detection unit according to one embodiment of the present invention.

FIG. 15 is an example diagram showing a second background detection unit according to one embodiment of the present invention. As shown in FIG. 15, the second background detection unit 22 comprises a PTZ-coordinate-acquisition module 220 and a PTZ-coordinate-detection module 221.

The PTZ-coordinate-acquisition module 220 is configured to acquire current PTZ coordinates of a camera and send the PTZ coordinates to the PTZ-coordinate-detection module 221. For example, if the PTZ-coordinate-acquisition module 220 does not acquire the PTZ coordinates of the camera, that indicates that the camera does not have PTZ coordinates and the PTZ coordinates information cannot be detected. Then the PTZ-coordinate-acquisition module 220 sends a stable-background signal to the encoding switching module 3 and the first background detection unit 21. The background-segregation encoding method is adopted by default or the first background detection unit 21 is triggered to execute other encoding switching methods.

The PTZ-coordinate-detection module 221 (e.g., connected to the PTZ-coordinate-acquisition module 220) is configured to detect whether the PTZ coordinates change. When the change of the PTZ coordinates is detected, the PTZ-coordinate-detection module 221 sends an unstable-background signal to the encoding switching module 3 which switches to the non-background encoding method. If the change of the PTZ coordinates is not detected, the PTZ-coordinate-detection module 221 sends a stable-background signal to the encoding switching module 3 which switches the background-segregation encoding method.

Figure 16:
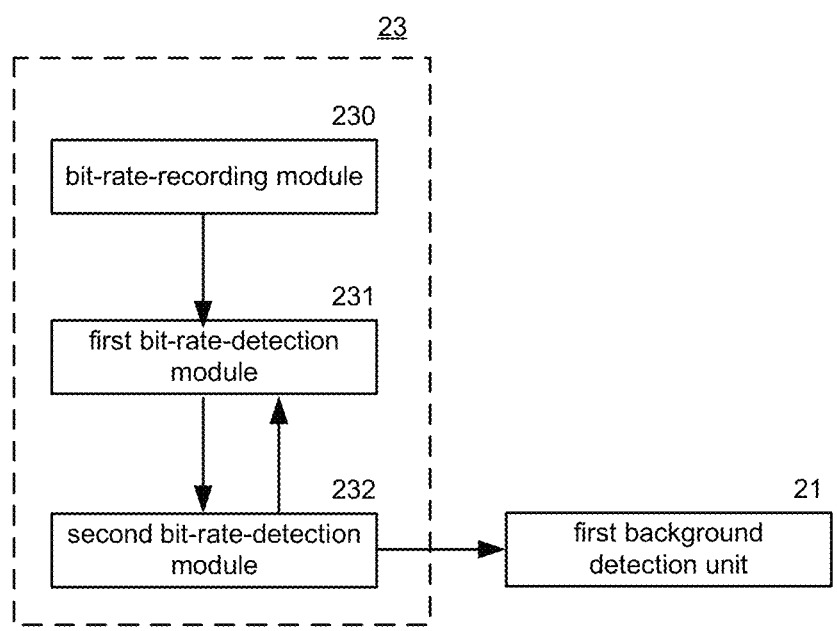
FIG. 16 is an example diagram showing a third background detection unit according to one embodiment of the present invention.

FIG. 16 is an example diagram showing a third background detection unit according to one embodiment of the present invention. As shown in FIG. 16, the third background detection unit 23 comprises: a bit-rate-recording module 230, a first bit-rate-detection module 231 and a second bit-rate-detection module 232.

The bit-rate-recording module 230 is configured to generate real-time statistics of bit rates within a time period. For example, bit rate values of the latest 25 frames can be recorded. A bit rate curve with bit rate values and time as coordinates can be generated so as to detect whether the bit rate curve varies suddenly.

The first bit-rate-detection module 231 (e.g., connected to the bit-rate-recording module 230) is configured to detect whether a change of the bit rates between consecutive times exceeds a third threshold value. The first bit-rate-detection module 231 receives bit rate values sent by the bit-rate-recording module 230 and detects whether the bit rate between consecutive times varies suddenly. When a sudden change of the bit rates is detected, the first bit-rate-detection module 231 detects whether the change exceeds the predetermined third threshold value. If the change exceeds the predetermined third threshold value, a first bit-rate-sudden-change signal is sent to the second bit-rate-detection module 232. If the change does not exceed the predetermined third threshold value, whether the bit rate value varies suddenly is detected continuously.

The second bit-rate-detection module 232 (e.g., connected to the first bit-rate-detection module 231) is configured to detect whether the time period during which the change of the bit rates exceeds the third threshold value is longer than a fourth threshold value. For example, the second bit-rate-detection module 232 receives the first bit-rate-sudden-change signal sent by the first bit-rate-detection module 231 and detects whether the time period during which the change of the bit rates exceeds the third threshold value is longer than the fourth threshold value. If the time period during which the change of the bit rates exceeds the third threshold value is longer than the fourth threshold value, a second bit-rate-sudden-change signal is sent to the first background detection unit 21 to trigger encoding switching operations based on the background model. If the time period during which the change of the bit rates exceeds the third threshold value is not longer than the fourth threshold value, a bit-rate-normal signal is sent to the first bit-rate-detection module 231 which continues to detect whether the bit rate varies suddenly.

In sum, the hybrid encoding system 1200 executes encoding switching operations based on background detection in the entire encoding process. For example, if no stable background frame is detected, the encoding process switches to the non-background encoding method. If one or more stable background frames are detected, the encoding process switches to the background-segregation encoding method. The hybrid encoding system 1200 can solve the application bottleneck problem of the background-segregation encoding method to ensure quality and achieve bit rate savings.

The hybrid encoding methods and systems are provided based on encoding switching. The encoding switching is realized through combination of the background-segregation encoding method and the non-background encoding method. High-quality encoding can be achieved using low bit rates with fixed backgrounds, and the encoding quality is maintained when backgrounds change.

Figure 17:
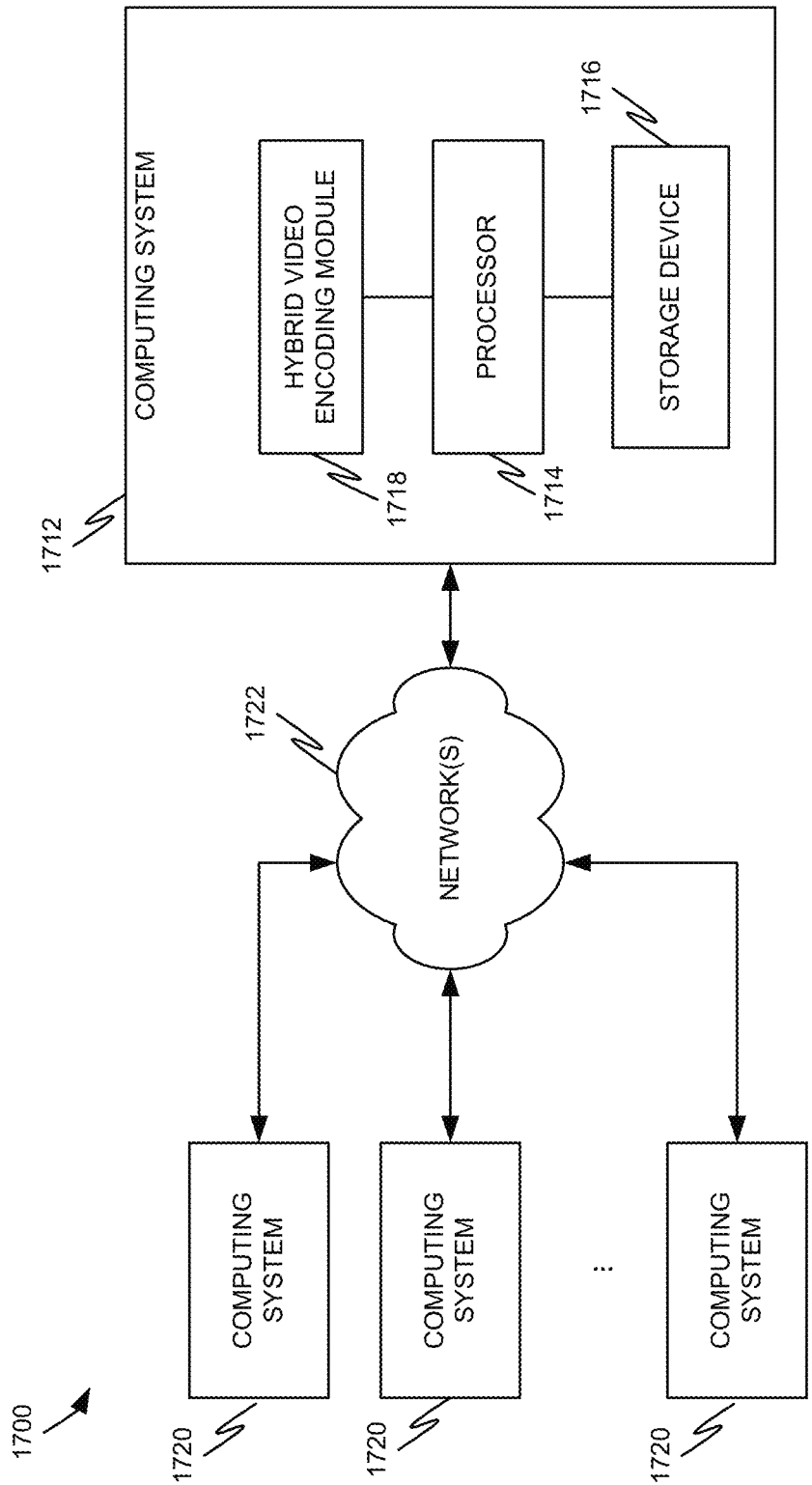
FIG. 17 is an example diagram for a system for hybrid video encoding according to one embodiment of the present invention.

FIG. 17 is an example diagram for a system for hybrid video encoding according to one embodiment of the present invention. As shown in FIG. 17, the system 1700 includes a computing system 1712 which contains a processor 1714, a storage device 1716 and a hybrid-video-encoding module 1718. The computing system 1712 includes any suitable type of computing device (e.g., a server, a desktop, a laptop, a tablet, a mobile phone, etc.) that includes the processor 1714 or provide access to a processor via a network or as part of a cloud based application. The hybrid-video-encoding module 1718 includes tasks and is implemented as part of a user interface module (not shown in FIG. 17).

Figure 18:
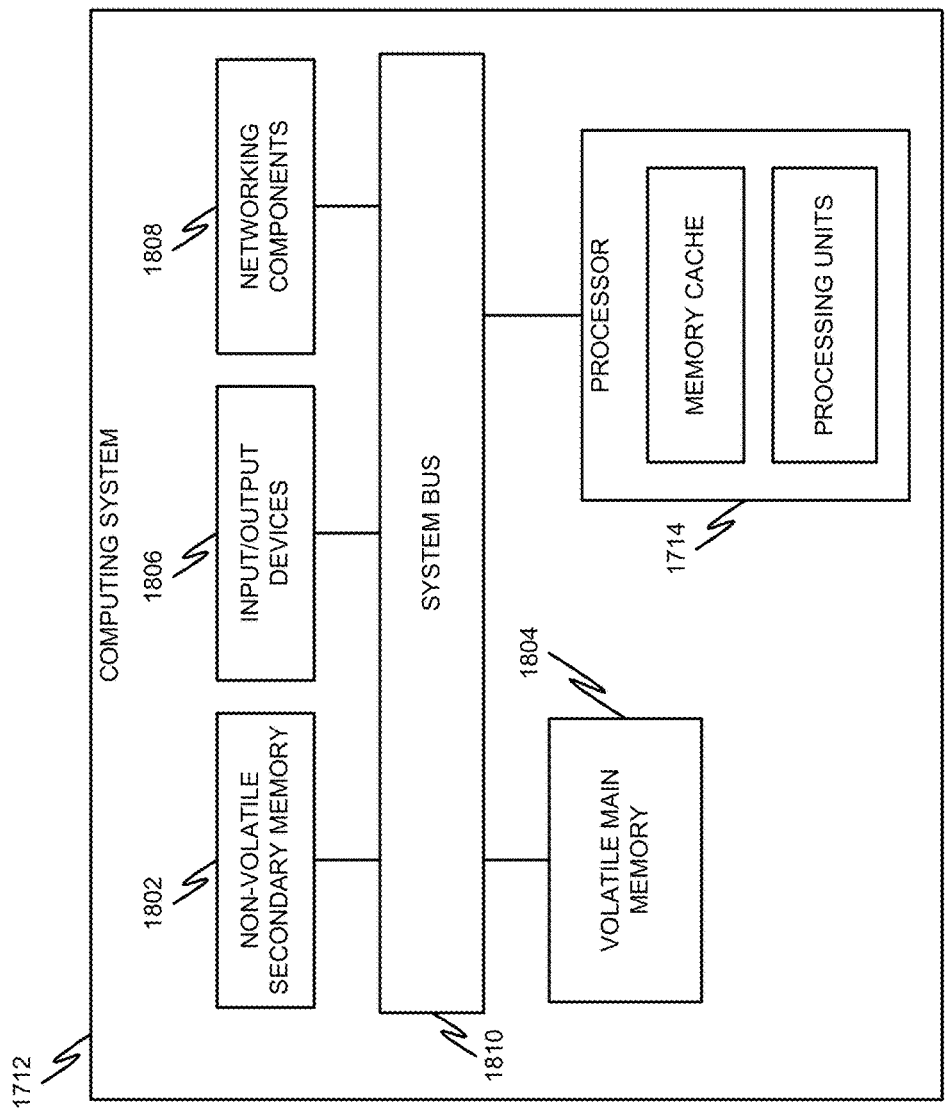
FIG. 18 is an example diagram showing a computing system for hybrid video encoding.

FIG. 18 is an example diagram showing a computing system for hybrid video encoding. As shown in FIG. 17, the computing system 1612 includes a processor 1614, memory devices 1702 and 1704, one or more input/output devices 1706, one or more networking components 1708, and a system bus 1710. In some embodiments, the computing system 1612 includes the hybrid-video-encoding module 1718, and provides access to the hybrid-video-encoding module 1718 to a user as a stand-alone computer.

According to one embodiment, a method for hybrid video encoding. An example method includes: acquiring image information; extracting a background image based at least in part on the image information; detecting whether the background image is stable; and performing encoding switching between a background-based encoding method and a non-background encoding method based at least in part on the detection.

According to another embodiment, a system for hybrid video encoding includes: a background modeling module configured to extract a background image based at least in part on image information; a background detection module configured to detect whether the background image is stable; an encoding switching module configured to perform encoding switching between a background-based encoding method and a non-background encoding method based at least in part on the detection; and an encoder configured to perform encoding operations based at least in part on an encoding-switching command from the encoding switching module.

According to yet another embodiment, a system for hybrid video encoding includes: one or more data processors; and one or more non-transitory computer-readable storage media encoded with instructions for commanding the data processors to execute certain operations. The operations include: acquiring image information; extracting a background image based at least in part on the image information; detecting whether the background image is stable; and performing encoding switching between a background-based encoding method and a non-background encoding method based at least in part on the detection.

According to yet another embodiment, a non-transitory computer-readable storage medium is encoded with instructions for commanding one or more processors to execute a method for hybrid video encoding. The method comprises: acquiring image information; extracting a background image based at least in part on the image information; detecting whether the background image is stable; and performing encoding switching between a background-based encoding method and a non-background encoding method based at least in part on the detection.

The above only describes several scenarios presented by this invention, and the description is relatively specific and detailed, yet it may not therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims may prevail. Also, the diagrams in the present disclosure are merely examples, which should not unduly limit the scope of the claims. One of ordinary skill in the art would recognize many variations, alternatives, and modifications.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations/processes are depicted in the drawings in a particular order, this should not be understood as requiring that such operations/processes be performed in the particular order shown or in sequential order, or that all illustrated operations/processes be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for hybrid video encoding, the method comprising:
   acquiring, using one or more processors, frame information;
   extracting, using the one or more processors, a background image based at least in part on the frame information;
   calculating, using the one or more processors, a confidence degree of the background image;
   determining, using the one or more processors, whether the confidence degree is smaller than a predetermined threshold value;
   in response to the confidence degree being smaller than the predetermined threshold value, the one or more processors switching to a non-background encoding method; and
   in response to the confidence degree being not smaller than the predetermined threshold value, the one or more processors
      acquiring foreground points for one or more foreground images,
      acquiring frame difference points for one or more frames,
      detecting, within a predetermined time period, a foreground image with foreground points smaller than a first threshold,
      detecting, within the predetermined time period, a frame difference image with frame difference points smaller than a second threshold,
      in response to a foreground image with foreground points smaller than the first threshold and a frame difference image with frame difference points smaller than the second threshold being detected within the predetermined time period, switching to the background-based encoding method, and
      in response to a foreground image with foreground points smaller than the first threshold and a frame difference image with frame difference points smaller than the second threshold not being detected within the predetermined time period, switching to the non-background encoding method.

2. The method of claim 1, wherein the background-based encoding method includes:
   acquiring an original frame at a current moment;
   acquiring a foreground image based at least in part on the original frame;
   acquiring a background image based at least in part on the original frame; and
   acquiring a region of variation based at least in part on the background image.

3. The method of claim 2, wherein acquiring a background image based at least in part on the original frame includes:
   comparing frame difference images of a previous frame and a current frame;
   determining whether an image of the current frame is a stable image that does not contain foreground information;
   in response to the image of the current frame being a stable image that does not contain foreground information, taking the current frame as the background frame; and
   in response to the image of the current frame being not a stable image that does not contain foreground information, acquiring the original frame at the current moment.

4. The method of claim 1, wherein:
   the confidence degree of the background image corresponds to a whole-image confidence degree;
   the whole-image confidence degree represents a confidence degree of the background image;
   the whole-image confidence degree is obtained through calculating, in a background-confidence-degree image, a proportion of macro blocks of which confidence degrees are greater than a threshold value.

5. The method of claim 1, wherein switching between the background-based encoding method and the non-background encoding method is further based at least in part on PTZ coordinates, including:
   detecting PTZ coordinates in the image information;
   in response to a change of the PTZ coordinates not being detected, switching to the background-based encoding method; and
   in response to a change of the PTZ coordinates being detected, switching to the non-background encoding method.

6. The method of claim 5, wherein in response to a change of the PTZ coordinates not being detected, switching to the background-based encoding method includes:
   performing encoding switching based at least in part on the background image.

7. The method of claim 1, wherein switching between the background-based encoding method and the non-background encoding method is further based at least in part on bit-rate changes, including:
   recording one or more bit rates within a first time period;
   detecting whether a change of the bit rates between consecutive times exceeds a third threshold value;
   in response to the change of the bit rates between consecutive times not exceeding the third threshold value, continuing recording the bit rates within the first time period;

in response to the change of the bit rates between consecutive times exceeding the third threshold value, detecting whether a duration time during which the change of the bit rates exceeds the third threshold value is longer than a fourth threshold value;

in response to the duration time during which the change of the bit rates exceeds the third threshold value being longer than the fourth threshold value, performing encoding switching based at least in part on a background model; and in response to the second time period during which the change of the bit rates exceeds the third threshold value being not longer than the fourth threshold value, continuing recording the bit rates within the first time period.

8. A system for hybrid video encoding, comprising:
one or more processors embedded in a digital camera, the one or more processors including:
a background modeling processor configured to extract a background image based at least in part on frame information;
a background detection processor configured to detect whether the background image is stable;
an encoding switching processor configured to perform encoding switching between a background-based encoding method and a non-background encoding method based at least in part on the detection; and
an encoder configured to perform encoding operations based at least in part on an encoding-switching command from the encoding switching processor;
the background detection processor being configured to,
calculate a confidence degree of the background image,
determine whether the confidence degree is smaller than a predetermined threshold value,
in response to the confidence degree being smaller than the predetermined threshold value, cause the encoding switching processor to switch to a non-background encoding method,
in response to the confidence degree being not smaller than the predetermined threshold value,
acquire foreground points for one or more foreground images,
acquire frame difference points for one or more frames,
detect, within a predetermined time period, a foreground image with foreground points smaller than a first threshold,
detect, within the predetermined time period, a frame difference image with frame difference points smaller than a second threshold,
in response to a foreground image with foreground points smaller than the first threshold and a frame difference image with frame difference points smaller than the second threshold being detected within the predetermined time period, cause the encoding switching processor to switch to the background-based encoding method, and
in response to a foreground image with foreground points smaller than the first threshold and a frame difference image with frame difference points smaller than the second threshold not being detected within the predetermined time period, cause the encoding switching processor to switch to the non-background encoding method.

9. The system of claim 8, wherein the background detection processor includes:
an image preprocessing processor configured to preprocess an original frame to obtain one or more preset image formats;
a foreground image extraction processor configured to perform background modeling to extract a foreground image that includes one or more moving objects from the frame; and
a background image extraction processor configured to extract a background image from the frame based at least in part on the foreground image.

10. The system of claim 8, wherein the background detection processor includes:
a first background detection unit configured to perform background detection based at least in part on one or more confidence degrees of a background image and one or more background frames;
a second background detection unit configured to perform background detection based at least in part on PTZ coordinates; or
a third background detection unit configured to perform background detection based at least in part on bit rates.

11. The system of claim 10, wherein the second background detection unit includes:
a PTZ-coordinate-acquisition processor configured to acquire current PTZ coordinates of the digital camera; and
a PTZ-coordinate-detection processor configured to detect whether the PTZ coordinates change;
wherein the PTZ-coordinate-detection processor is further configured to:
in response to a change of the PTZ coordinates being detected, send an unstable-background signal to the encoding switching processor to switch to the non-background encoding method; and
in response to a change of the PTZ coordinates not being detected, send a stable-background signal to the encoding switching processor to switch to the background-based encoding method.

12. The system of claim 8, wherein two or more of the background modeling processor, background detection processor, encoding switching processor, and encoder are implemented by the same processing device.

13. A system for hybrid video encoding, comprising:
one or more processors embedded in a digital camera, the one or more processors including:
a background modeling processor configured to extract a background image based at least in part on frame information,
a background detection processor configured to detect whether the background image is stable, the background detection processor including a background detection unit configured to perform background detection based at least in part on bit rates;
an encoding switching processor configured to perform encoding switching between a background-based encoding method and a non-background encoding method based at least in part on the detection; and
an encoder configured to perform encoding operations based at least in part on an encoding-switching command from the encoding switching processor;
wherein the background detection unit of the background detection processor includes, a bit-rate-recording processor configured to generate real-time statistics of bit rates within a first time period, a first bit-rate-detection processor configured to detect whether a change of the bit rates between consecutive times exceeds a first threshold value and, in response to the change of the bit rates between consecutive times exceeding the first threshold value, generate a first bit-rate-sudden-change signal, and a second bit-rate-detection processor configured to, in response to the first bit-rate-sudden-change signal, detect whether a duration time during which the change of the bit rates exceeds the first threshold value is longer than a second threshold value, and wherein the second bit-rate-detection processor is further configured to:

in response to the duration time during which the change of the bit rates exceeds the first threshold value being longer than the second threshold value, send a second bit-rate-sudden-change signal to the first background detection unit to trigger encoding switching based at least in part on the background image; and in response to the duration time during which the change of the bit rates exceeds the first threshold value being not longer than the second threshold value, send a bit-rate-normal signal to the first bit-rate-detection processor, wherein the first bit-rate-detection processor is further configured to continue to detect whether the bit rate varies suddenly.

14. The system of claim 13, wherein two or more of the background modeling processor, background detection processor, encoding switching processor, and encoder are implemented by the same processing device.

* * * * *

(12) SUPPLEMENTAL EXAMINATION CERTIFICATE
United States Patent
Tong et al.

(10) Number: US 10,187,649 F1
(45) Certificate Issued: Feb. 19, 2020

Control No.: 96/000,314

Filing Date: Jan. 22, 2020

Primary Examiner: Mark Sager

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| CN | 102625106A | 8/2012 |
| CN | 101511026A | 8/2009 |
| CN | 101720044A | 6/2010 |
| CN | 101489138A | 7/2009 |